United States Patent
Temple et al.

(10) Patent No.: US 9,510,514 B2
(45) Date of Patent: Dec. 6, 2016

(54) LOCKOUT CLOSURE MECHANISM FOR AGRICULTURAL VEHICLE

(71) Applicant: DEERE & COMPANY, Moline, IL (US)

(72) Inventors: Douglas G. Temple, Fulton, IL (US); Brian J. Tank, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/685,867

(22) Filed: Apr. 14, 2015

(65) Prior Publication Data

US 2016/0302362 A1     Oct. 20, 2016

(51) Int. Cl.
*A01D 17/02* (2006.01)
*A01F 12/46* (2006.01)
*A01F 12/60* (2006.01)

(52) U.S. Cl.
CPC ............. *A01F 12/60* (2013.01); *A01F 12/46* (2013.01)

(58) Field of Classification Search
CPC .... A01D 41/1217; A01D 69/00; A01D 41/12; A01F 12/46; A01F 12/44
USPC .......................................... 460/103, 104, 114
See application file for complete search history.

(56) References Cited

U.S. PATENT DOCUMENTS

| | | | | |
|---|---|---|---|---|
| 3,101,721 A | * | 8/1963 | Fuller | A01F 12/185 460/109 |
| 3,677,540 A | * | 7/1972 | Weiss | A01C 15/00 222/23 |
| 4,289,440 A | | 9/1981 | Walberg | |
| 4,466,447 A | * | 8/1984 | Hoefer | A01F 12/52 460/13 |
| 5,167,581 A | * | 12/1992 | Haag | A01D 41/1217 460/114 |
| 5,424,957 A | * | 6/1995 | Kerkhoff | A01K 5/0275 119/51.02 |
| 5,453,050 A | * | 9/1995 | Underwood | A01D 41/1208 460/114 |
| 6,743,093 B1 | * | 6/2004 | Pope | A01D 41/1217 460/103 |

(Continued)

FOREIGN PATENT DOCUMENTS

EP     1425950 A1     6/2004
EP     2245917 B1     1/2016

(Continued)

OTHER PUBLICATIONS

European Patent Office, Extended European Search Report in Application No. 16162538.9 dated Jun. 16, 2016.

*Primary Examiner* — Árpád Fábián-Kovács
(74) *Attorney, Agent, or Firm* — Lorenz & Kopf, LLP (57) ABSTRACT

A lockout closure includes an interlock device and a closure panel. The interlock device may be operatively coupled to a moving device and have a movable switch mechanism for interrupting operation of the device. The closure panel may have an engagement surface movable with respect to the interlock device in order to interact with the switch mechanism. The closure panel may be movable between an open position, in which the closure panel is positioned to uncover an access opening, and a closed position, in which the closure panel is positioned to cover the access opening. When the closure panel is in the open position, the engagement surface engages or disengages the switch mechanism so that the interlock device interrupts operation of the moving device.

17 Claims, 7 Drawing Sheets

(56) References Cited

U.S. PATENT DOCUMENTS

| | | | | |
|---|---|---|---|---|
| 7,395,650 | B2* | 7/2008 | Mossman | A01D 61/002 56/119 |
| 8,858,310 | B2* | 10/2014 | Cooksey | A01F 12/46 460/103 |
| 9,049,817 | B2* | 6/2015 | McCully | A01D 41/1217 |
| 2004/0184905 | A1* | 9/2004 | Kinzenbaw | B60P 1/42 414/526 |
| 2005/0169706 | A1* | 8/2005 | Dillingham | A01C 15/006 404/110 |
| 2006/0254235 | A1* | 11/2006 | Dueckinghaus | F16H 61/4043 56/11.9 |
| 2007/0084378 | A1* | 4/2007 | Creighton | B61D 7/02 105/247 |
| 2008/0161077 | A1* | 7/2008 | Honey | A01D 75/187 460/106 |
| 2009/0186674 | A1* | 7/2009 | Claerhout | A01F 12/44 460/103 |
| 2009/0280876 | A1* | 11/2009 | Yoder | A01F 12/444 460/100 |
| 2010/0275563 | A1* | 11/2010 | Mackin | A01D 41/1217 56/10.2 R |

FOREIGN PATENT DOCUMENTS

| | | | | |
|---|---|---|---|---|
| GB | 861227 | | 2/1961 | |
| JP | 2003250331 | A * | 9/2003 | A01F 12/46 |
| WO | 2013107718 | A1 | 7/2013 | |
| WO | 2015009142 | A1 | 1/2015 | |

* cited by examiner

LOCKOUT CLOSURE MECHANISM FOR AGRICULTURAL VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to a lockout closure mechanism that when opens cuts or prevents the connection of power to a moving component in an agricultural vehicle work.

BACKGROUND OF THE DISCLOSURE

Agricultural vehicles, such as agricultural combines, have various moving components configured to carry out various tasks. For example, various agricultural combines may include powered components to gather and clean grain from planted crops, powered components to transfer the cleaned grain to a storage area such as a grain tank, and powered components to transfer that grain out of the storage area.

Access to areas near various of these powered components may be needed for various reasons, including for periodic maintenance or cleaning. For example, in a combine with various moving components contained within a grain tank, the area beneath the moving components may fill with the grain or debris and may accordingly need to be cleaned from time to time.

SUMMARY OF THE DISCLOSURE

This disclosure provides a lockout out closure mechanism for interrupting power to a moving component within an agricultural vehicle when the mechanism is positioned so as to open an access opening near the moving component.

In one aspect the disclosure provides a lockout closure for an agricultural combine having a grain tank with an access opening and a powered grain-moving device associated with the grain tank. The lockout closure includes an interlock device and a closure panel. The interlock device is operatively coupled to the grain-moving device and has a movable switch mechanism for interrupting operation of the grain-moving device. The closure panel is movably attached to the grain tank and has an engagement surface that is movable with respect to the interlock device in order to interact with the switch mechanism. The closure panel is movable between an open position, in which the closure panel is positioned to uncover the access opening, and a closed position, in which the closure panel is positioned to cover the access opening. When the closure panel is in the open position, the engagement surface engages or disengages the switch mechanism such that the interlock device interrupts operation of the grain-moving device. For example, the engagement surface may disengage the switch mechanism when the closure panel is in the open position and engage the switch mechanism when the closure panel is in the closed position.

In certain embodiments the grain-moving device may be hydraulically powered, and the interlock device may include a hydraulic valve. In that case, the switch mechanism may open and close the hydraulic valve to control a flow of hydraulic fluid. When the hydraulic valve is open, the flow of hydraulic fluid may activate a hydraulic piston in order to apply operational tension to a drive belt for the grain-moving device.

In certain embodiments, the engagement surface of the closure panel may be included on a lockout member extending away from a closing face of the closure panel. The lockout member may include a ramp segment.

In certain embodiments the closure panel may be slidably engaged with the grain tank. The lockout member may form part of a side wall of the closure panel, and the ramp segment may extend from the side wall at an oblique angle with respect to an outer face of the side wall. The ramp segment may engage or disengage the switch mechanism when the closure panel is slid from the closed position to the open position in order to interrupt operation of the grain-moving device.

In certain embodiments the closure panel may be pivotally engaged with the grain tank. The lockout member may be disposed a perpendicular or oblique angle with respect to the closing face of the closure panel so that the lockout member engages or disengages the switch mechanism when the closure panel is pivoted from the closed position to the open position in order to interrupt operation of the grain-moving device.

In certain embodiments the switch mechanism may extend a first extension distance from a body of the interlock device when engaged and may extend a second extension distance from the body of the interlock device when disengaged. The first distance is different from the second distance. A first segment of the side wall may extend along a side plane that is perpendicular to the closing face of the closure panel. A second segment of the side wall may extend along an offset plane spaced from the side plane to form a gap between the body of the interlock device and the second segment of the side wall. The gap may have a gap distance at least as long as the difference between the first extension distance and the second extension distance of the switch mechanism. The ramp segment may extend between the first and second segments of the side wall such that when the closure panel is slidably moved from the closed position to the open position, the ramp segment causes the switch mechanism to move between the first or second extension distances, in order to interrupt operation of the grain-moving device.

In another aspect the disclosure provides a lockout closure for an agricultural combine having a grain tank with an access opening, a powered auger associated with the grain tank, and a control and actuation system for the auger. The lockout closure includes an interlock device and a closure panel. The interlock device is operatively coupled to the control and actuation system and has a movable switch mechanism for interrupting operation of the auger. The closure panel is movably attached to the grain tank and has an engagement surface that is movable with respect to the interlock device in order to interact with the switch mechanism. The closure panel is movable between an open position, in which the closure panel is positioned to uncover the access opening, and a closed position, in which the closure panel is positioned to cover the access opening. When the closure panel is in the open position, the engagement surface engages the switch mechanism such that the interlock device interrupts operation of the auger. When the closure panel is in the closed position, the engagement surface disengages the switch mechanism such that the interlock device permits operation of the auger.

In still another aspect the disclosure provides an agricultural combine having a grain tank with an access opening, an auger disposed, at least in part, within the grain tank, a control and actuation assembly for powering the auger, and a lockout closure. The lockout closure includes an interlock device and a closure panel. The interlock device has a movable switch mechanism operatively coupled to the control and actuation assembly. The closure panel is movably attached to the grain tank to cover the access opening and has an engagement surface configured to interact with the switch mechanism of the interlock device. The closure panel is movable between an open position, in which the closure panel is positioned to uncover the access opening, and a closed position, in which the closure panel is positioned to cover the access opening. When the closure panel is in the open position, the engagement surface disengages the switch mechanism such that the interlock device interrupts operation of the auger. When the closure panel is in the closed position, the engagement surface engages the switch mechanism such that the interlock device permits operation of the auger.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed lockout closure mechanism (or "lockout closure"), as illustrated with respect to the accompanying figures of the drawings described briefly above. Various modifications to the example embodiments may be contemplated by one of skill in the art, and it should be understood that the sequencing method may be used with a variety of vehicles in a variety of settings.

As noted above, it may be useful to access various areas or components within an agricultural vehicle for cleaning, maintenance, or other reasons. In certain implementations, however, accessing such areas or components may expose an operator to moving parts of various types of powered components. Accordingly, it may be useful to provide an mechanism configured to interrupt the operation of various powered components when a user accesses a particular area. The disclosed lockout closure may provide this (and other) functionality.

In certain embodiments, a closure panel may be provided for closing an access opening to a particular area during operation of certain mechanisms. For example, a sliding or hinged panel formed of sheet metal or plastic may be provided near the base of a grain tank (or other storage area) of an agricultural combine (or "combine"), in order to close an access opening for a cleanout area below an auger (or other powered component) for the grain tank. In certain embodiments, a closure panel may exhibit a generally planar geometry over a closing face configured to cover an associated access opening. In certain embodiments, a closure panel may exhibit a closing face (or other features) of other geometry.

Generally, a closure panel may be viewed as being in a closed position (or, simply, "closed") when the closure panel is disposed to prevent access to an internal area of a combine (or other machine) via an access opening associated with the closure panel. For example, a closure panel may be viewed as closed when the closure panel substantially covers or blocks an associated access opening. Similarly, a closure panel may be viewed as being in an open position (or, simply, "open") when the closure panel is disposed to allow access to the internal area of the combine (or other machine) via the access opening. For example, a closure panel may be viewed as open when the closure panel has been substantially removed from the associated access opening.

In the disclosed lockout closure, an interlock device may be configured to interoperate with the closure panel, such that power is provided to the auger (or another component) when the closure panel is in a closed position (i.e., when the closure panel covers the access opening to prevent access to an internal area). Further, the interlock device may be configured such that power is not provided to the auger (or another component) and operation of the auger thereby interrupted, when the closure panel is in an open position (i.e., when the closure panel does not cover, or only partially covers, the access opening to provide access to the internal area).

In certain embodiments, the interlock device may include a switch mechanism, which may be engaged (or disengaged) by an engagement surface of the closure panel, depending on the orientation of the closure panel, in order to selectively control the powering of various component. In certain embodiments, when the closure panel is closed, and the switch is correspondingly engaged, the interlock device may permit power may be provided to various components for operation. When the closure panel is open, and the switch is correspondingly disengaged, power may not be provided to the various components such that operation of the components may be interrupted. In other embodiments, the switch may operate in a different manner. For example, the switch may be engaged when the closure panel is open and thereby interrupt operation of various components, and may be disengaged when the closure panel is closed and thereby permit operation of various components In certain embodiments, the interlock device may be configured as a hydraulic valve (or valve assembly), with the valve allowing or blocking a hydraulic flow relating to the powering of a particular component, based upon the orientation of the closure panel. For example, in certain embodiments, when the closure panel is in the closed position, the engagement surface of the closure panel may engage the switch of the valve and thereby permit the flow of hydraulic fluid through the valve. In contrast, when the closure panel is in the open position, the switch may be disengaged and the flow of hydraulic fluid through the valve may be blocked (or otherwise reduced or altered).

In various embodiments, closure panels, interlock devices, and switch mechanisms may exhibit various different characteristics and may be configured to interoperate in various different ways. In certain embodiments, a closure panel may be configured to slide between open and closed positions, and may accordingly engage (or disengage) the switch mechanism as the closure panel slides. In certain embodiments, a closure panel may be configured to pivot (e.g., about hinges) between the open and closed positions, and may accordingly engage (or disengage) the switch mechanism as the closure panel pivots.

Figure 1:
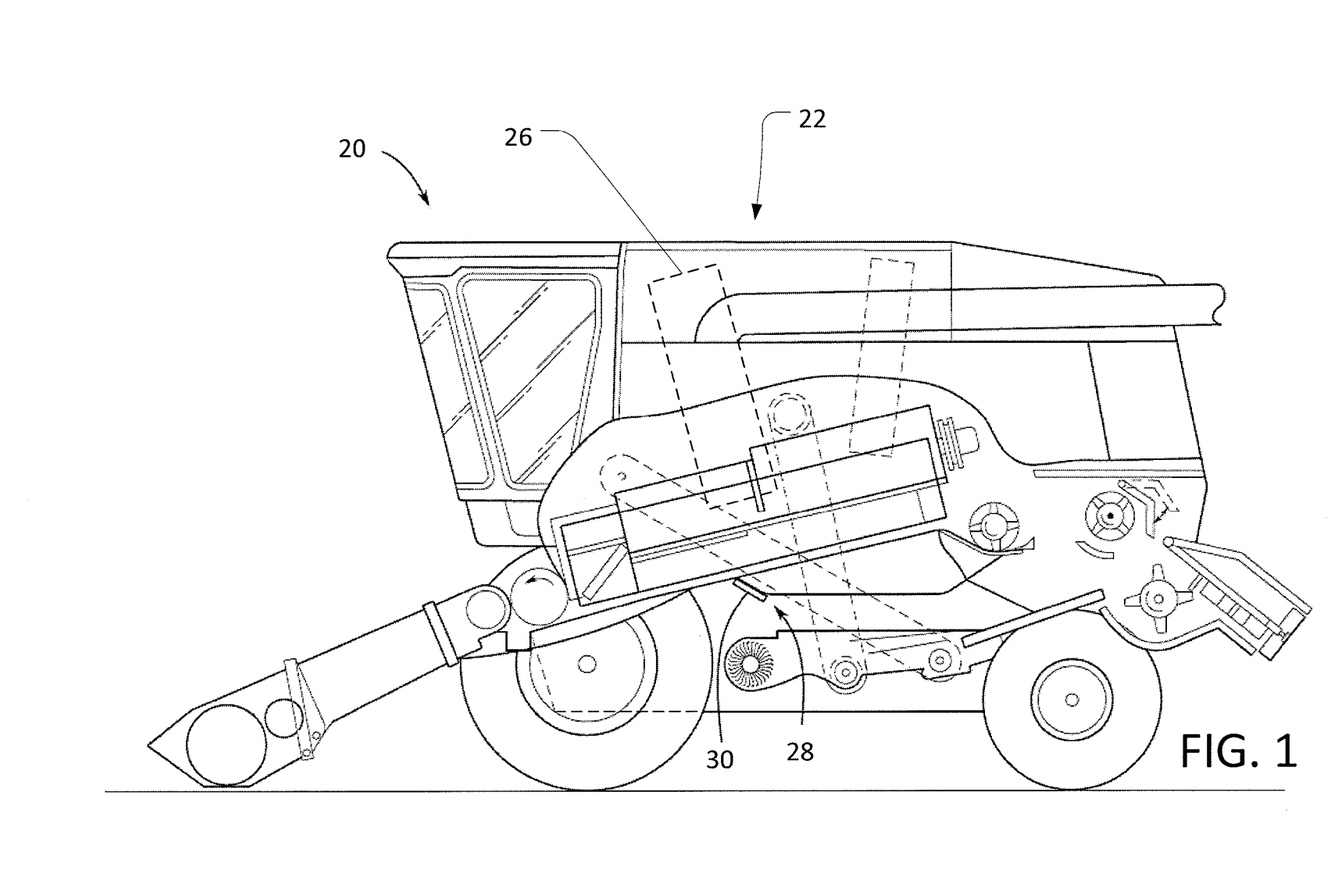
FIG. 1 is side view of an example agricultural vehicle in the form of an agricultural combine having a lockout closure mechanism as disclosed herein.
Figure 2:
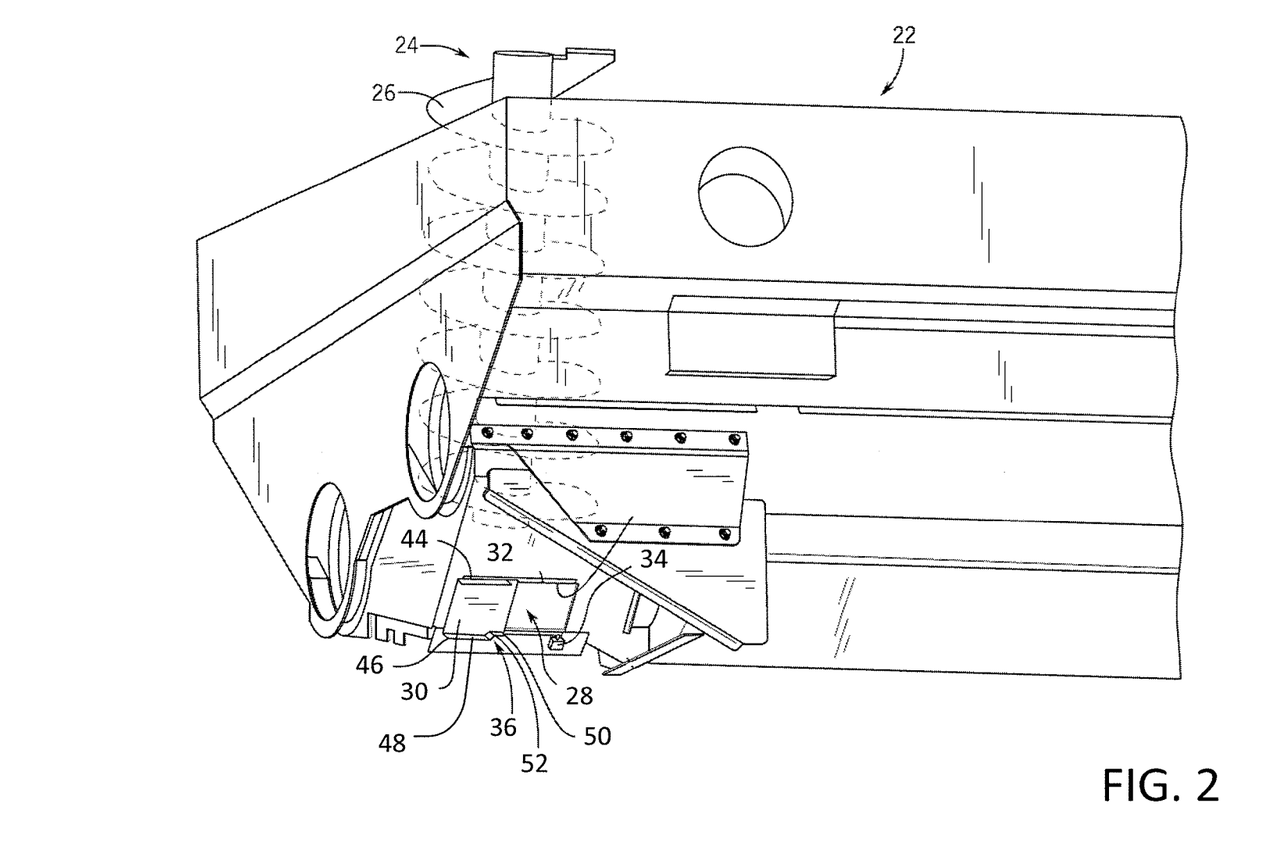
FIG. 2 is a perspective view of the exterior of the storage area of the agricultural combine of FIG. 1, depicting one exemplary location of an access opening into the storage area and the lockout closure mechanism.

The disclosed lockout closure may be utilized with various vehicles, including various agricultural vehicles. Referring to FIGS. 1 and 2, in certain embodiments, the lockout closure may be utilized with respect to a combine 20. It will be understood that the combine 20 is presented as an example only, and that the lockout closure may be utilized with combines of other configurations, as well as with various other vehicles.

As depicted, the combine 20 includes a storage area, such as a grain tank 22, for storing grain (e.g., corn) that has been gathered and cleaned by the combine 20. One or more moving components 24 may be disposed within the grain tank 22 for moving grain into or out of the grain tank 22, or for various other functions. As depicted, the grain tank 22 includes an unloading auger 26, which may be utilized to offload grain from the tank 22 to another vehicle (or other location). Various examples of a lockout closure are discussed below with regard to access to the grain tank 22 and with regard to the powering (and interruption of the powering) of the auger 26. It will be understood, however, that other embodiments and implementations are possible.

In various embodiments, an access opening may be provided on the grain tank 22 (or elsewhere), in order to allow a user to access areas and components within the grain tank 22 (or at other locations within the combine 20). As depicted, for example, an access opening 28 is provided near the bottom of the grain tank 22, below the auger 26. The access opening 28 is disposed in order to provide access to the interior of the grain tank 22 (or a related area). This may be useful, for example, in order to allow a user to clean out an area below the auger 26, or for various other operations. The location of the access opening 28 in FIG. 1 is presented as an example only. In other embodiments, the access opening 28 (or another access opening) may be disposed at other locations on the combine 20.

In various embodiments, a closure panel 30 may be provided to cover the access opening 28. Generally, the panel 30 (or a similar panel) may be configured to be moved (e.g., slid or pivoted) between open and closed positions. In the closed position (i.e., when "closed"), the closure panel 30 may cover or block the access opening 28 such that access to the interior of the grain tank 22 via the access opening 28 may be prevented. In contrast, in the open position (i.e., when "open"), the closure panel 30 may permit access to the interior of the grain tank 22 via the access opening 28.

The closure panel 30 may be configured in various ways, including with a generally solid structure, with an open structure such as a grating, or otherwise. In various embodiments, the closure panel 30 may be formed from one or more pieces sheet metal, plastic, or other material, which may be bent, welded, riveted, or otherwise manipulated in order to provide an appropriate geometry.

Referring specifically to FIG. 2, an example lockout closure 36 includes a closure panel 30 configured as a sheet metal panel slidably engaged with the exterior structure of the grain tank 22. The closure panel 30 may be connected to the grain tank 22 in various ways. As depicted, for example, the grain tank 22 includes a set of external rails 32, which may slidably support the closure panel 30 with respect to the grain tank 22. For example, in certain embodiments, the closure panel 30 may include mating channels (not shown) corresponding to the rails 32, or the rails 32 may include mating channels (not shown) corresponding to mounting features (not shown) on the closure panel 30. In certain embodiments, a drawer-slide, rolling or other track mechanism may alternatively (or additionally) be utilized. The closure panel 30 may be slid along the rails 32 between an open position (as depicted in FIG. 2) and a closed position (see, e.g., FIG. 4), in order to close the access opening 28 for operation of the combine 20.

Also as depicted, an interlock device includes a hydraulic valve 34 mounted to the exterior of the grain tank 22. As discussed with respect to FIGS. 11 and 12, below, the valve 34 may operate to control a flow of hydraulic fluid, based upon the position of the closure panel 30, in order to provide power to the auger 26 or to interrupt operation of the auger 26.

Figure 3:
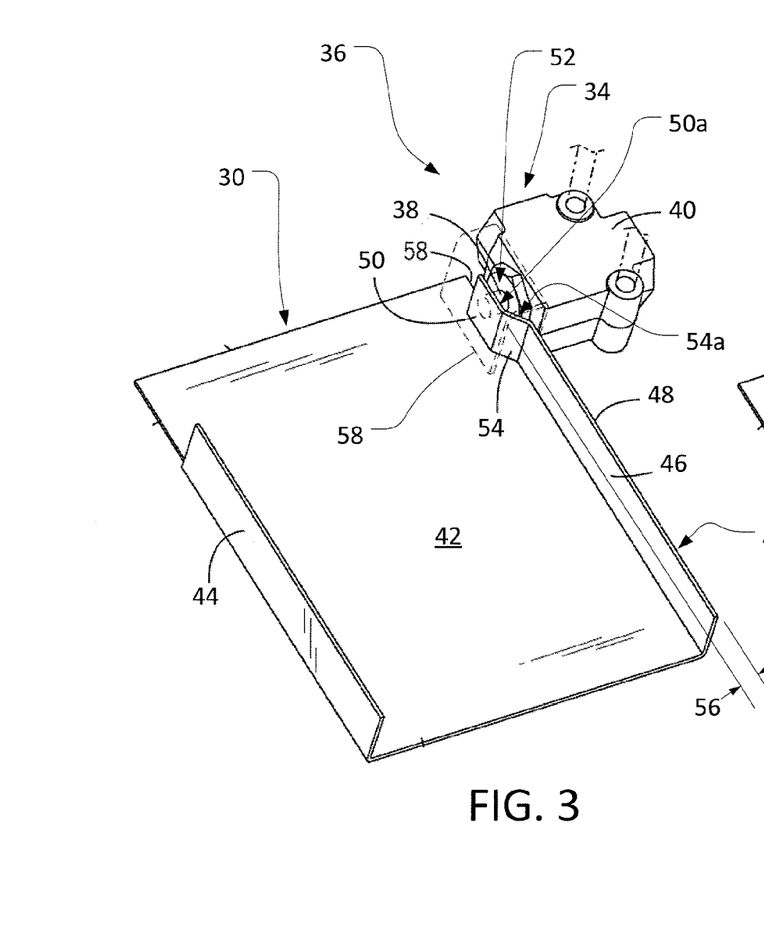
FIGS. 3 and 4 are perspective views of an example lockout closure mechanism shown in open and closed positions, respectively.
Figure 4:
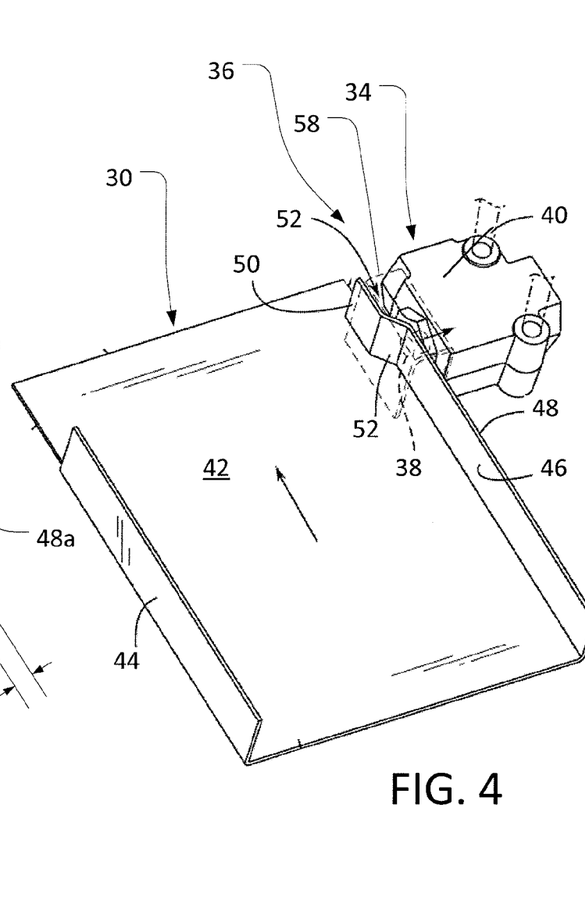

The lockout closure 36 may generally include a switch of various configurations, which may be engaged (or disengaged) by the closure panel 30 in order to selectively provide (or cut off) power for the auger 26. As depicted in FIGS. 3 and 4, for example, the hydraulic valve 34 includes a switch 38 configured as a solid member or button extending from a body 40 of the valve 34. When the button is depressed into the body 40 of the valve 34, the switch 38 may be viewed as engaged. Similarly, when the button is extended from the body 40 of the valve 34, the switch 38 may be viewed as disengaged. It will be understood, however, that other configurations are possible.

As discussed in greater detail below, the valve 34 may be configured such that, when the switch 38 is engaged, power is provided to the auger 26 and the auger 26 may operate to offload grain from the grain tank 22. In contrast, when the switch 38 is disengaged, power is not provided to the auger 26 and the auger 26 may not operate. In other embodiments, other configurations may be possible. For example, the lockout closure 36 (or an alternative mechanism) may be configured to provide power to the auger 26 (or other components) when the switch 38 is disengaged, and to remove power from the auger 26 (or other components) when the switch 38 is engaged.

Still referring to FIGS. 3 and 4, the example closure panel 30 includes a closing face 42, which is configured to generally cover the access opening 28 when the panel 30 is in the closed position. As depicted, the closing face 42 is formed from a single body of sheet metal, although other configurations are possible. The closure panel 30 also includes a set of side walls 44 and 46, which may provide stability to the closing face 42 as well as engage the rails 32 on the grain tank 22 (see FIG. 2) in order to allow the closure panel 30 to slide between open and closed positions. As depicted, the side walls 44 and 46 extend at an angle that is generally perpendicular to the closing face 42 and thereby define respective planes that are generally perpendicular to the closing face 42. In other embodiments, the side walls 44 and 46 (or portions thereof) may extend away from the closing face 42 (or other feature of the closure panel 30) at other angles (e.g., at various oblique angles).

As the closure panel 30 is slid toward the closed position (e.g., moved from the position depicted in FIG. 3 to the position depicted in FIG. 4), an engagement surface of the closure panel 30 may engage the switch 38 in order to allow operation of the auger 26. As depicted, for example, the side wall 46 includes a first segment 48, with an outer surface 48a, that is offset from a generally parallel second segment 50, with an outer surface 50a. Accordingly, as depicted, the segments 48 and 50 collectively define a set of parallel and offset planes. (It will be understood that other configurations are possible, including configurations with a non-parallel configuration of the segments 48 and 50.) As depicted, the two parallel segments 48 and 50 define a gap 52 between the segments 48 and 50, with a ramp segment 54 extending between the segments 48 and 50 such that the side wall 46 extends generally continuously along the segments 48, 50, and 54. Similarly to the segments 48 and 50, the ramp segment 54 includes an outer face 50a.

The gap 52, the ramp segment 54, and the parallel segments 48 and 50 may be collectively configured such that the side wall 46 (e.g., via the outer surfaces 48a, 50a and, 54a) generally engages the switch 38 when the closure panel 30 is slid into the closed position over the access opening 28 (see, e.g., FIG. 4). Further, the side wall 46 may generally disengage the switch 38 when the closure panel 30 is slid toward the open position (see, e.g., FIG. 2). In this way, when the closure panel 30 is in the closed position, the side wall 46 may cause power to be provided for operation of the auger 26, and when the closure panel 30 is in the open position, the side wall 46 may cause an interruption of the flow of power to the auger 26 and thereby interrupt the operation of the auger 26.

Various configurations of the switch 38 may be possible. For example, in some embodiments, the lockout closure 36 may be configured such that the switch is disengaged when the closure panel 30 is closed, and engaged when the closure panel 30 is open. In certain embodiments, the switch 38 may be depressed fully into the body 40, when engaged. In certain embodiments, the switch 38 may not be depressed fully into the body 40, when engaged. Accordingly, in various embodiments, a relevant measure of the gap 52 (as also noted above) may be the difference in the extension distance of the switch 38 out of the valve body 40 when the switch 38 is in the engaged and disengaged positions.

In the embodiment depicted, the switch 38 is configured to extend a particular extension distance 56 farther out of the valve body 40 when the switch 38 is disengaged than when the switch 38 engaged. The gap 52 between the side wall segments 46 and 50 (which is spanned by the ramp segment 54) may be configured to span approximately the extension distance 56, such that when the switch 52 is pressed against the outer surface 50a of the second segment 50 of the side wall 46 (e.g., when the closure panel 30 is open), the switch 38 may be disengaged, and when the switch 52 is pressed against the outer surface 48a of the first segment 48 of the side wall 46 (e.g., when the closure panel 30 is closed), the switch 52 may be engaged. In this regard, the outer surface 54a of the ramp segment 54 (and the other outer surfaces of the side wall 46) may serve as engagement surfaces, which may contact the switch 38 to depress the switch 38 into the valve body 40 (i.e., when the closure panel 30 is slid closed) or allow the switch 38 to extend out of the valve body 40 (i.e., when the closure panel 30 is slid open). Further, due to the oblique angle between the outer surface 54a of the ramp segment 54 and the outer surfaces 48a and 50a of the side wall segments 48 and 50, the outer surface 54a of the ramp segment 54 may contact the switch 38 as the closure panel 30 is slid with respect to the valve 34, in order to move the switch 38 smoothly between the engaged and disengaged positions (e.g., by acting as a cam, with respect to the switch 38). In this regard, the outer surface 54a of the ramp segment 54 may also be viewed as an engagement surface.

Due to its role in engaging and disengaging the switch 38, the side wall 46, including the various segments 48, 60, and 54, may be generally viewed as a lockout member. In other embodiments, a different lockout member may be provided for the closure panel 30 (or another closure panel) in order to engage and disengage the switch 38 (or another switch) to control the interruption of power delivery (and thereby interrupt operation of) the auger 26 (or another moving component 24). As discussed in greater detail below, for example, a bracket or other feature may be utilized as a lockout member in various embodiments.

In certain embodiments, a guard for the switch 38 may be provided. This may be useful, for example, in order to prevent the switch 38 from being accidentally engaged, and the auger 26 thereby accidently powered, when the closure panel 30 is not in the closed position. A guard may also, for example, serve to guide the closure panel 30 during a closing (or opening) operation, such that an engagement surface of the closure panel 30 appropriately engages (or disengages) the switch 38. In the embodiment depicted, a guard 58 is formed from a rigid bracket attached to the valve body 40 and extending inward (i.e., to the right in FIGS. 3 and 4) and over the switch 38. The guard 58, accordingly, may protect the switch 38 from accidental (or intentional, but untimely) impact or engagement, may shield the switch 38 (and corresponding features on the valve body 40) from debris, and may help to guide movement of the side wall 46 with respect to the switch 38.

Figures 5, 6:
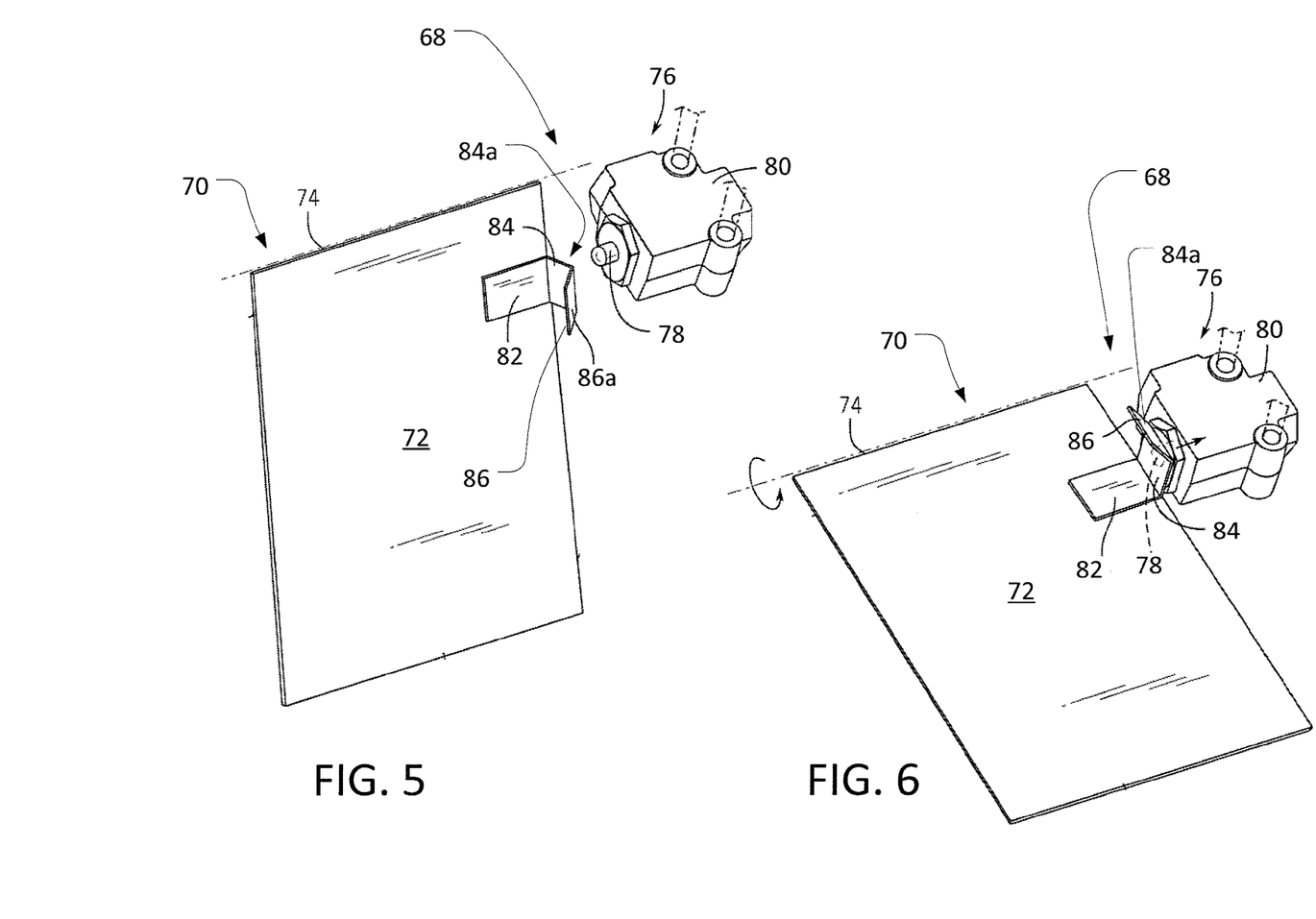
FIGS. 5 and 6 are perspective views of another example lockout closure mechanism shown in open and closed positions, respectively.

In certain embodiments, a closure panel may be pivotally movable with respect to the access opening 28, such that a switch may be engaged (or disengaged) by pivoting of the closure panel (e.g., rather than by sliding). Referring also to FIGS. 5 and 6, for example, another lockout closure 68 is depicted. As depicted in FIGS. 5 and 6, a closure panel 70 may also be configured to cover the access opening 28 (see FIGS. 1 and 2) with a closing face 72, when the closure panel 70 is in a closed position (see, e.g., FIG. 6), and to uncover the access opening 28 with the closing face 72, when the closure panel 70 is in an open position (see, e.g., FIG. 5). Rather than (or in addition to) sliding, however, the closure panel 70 may be configured to pivot open and closed about a pivot axis 74 (e.g., by way of pins, hinges, or another mechanism (not shown)). As depicted, the closure panel 70 does not include side walls similar to the side walls 44 and 46 of the closure panel (see, e.g., FIGS. 3 and 4). In certain embodiments, however, side walls similar to the side walls 44 and 46 (or other side walls) may be provided.

Because the closure panel 70 pivots between open and closed positions, it may be useful to configure an engagement surface of the closure panel 70 to engage (and disengage) a switch for a lockout closure when the closure panel 70 pivots. As depicted, for example, an interlock device configured as a hydraulic valve 76 with a button switch 78 extending from a body 80 of the valve (similar to the valve 34 and switch 38) may be provided, with the valve 76 configured to provide power to the auger 26 when the switch 78 is engaged and to interrupt power to the auger 26 when the switch 78 is disengaged. Correspondingly, a lockout member configured as a bracket 82 may be connected to the closing face 72 (or other feature of the closure panel 70), with a base segment 84 extending generally perpendicularly from the closing face 72 (or other feature) and a ramp segment 86 extending at a generally oblique angle from the base segment 84. As the closure panel 70 is pivoted about the axis 74 from an open position (e.g., as in FIG. 5) to a closed position (e.g., as in FIG. 6), outer surfaces 86a and 84a of the ramp segment 86 and then the base segment 84 of the bracket 82, respectively, may contact the switch 78, thereby urging the switch 78 into the valve body 80 (e.g., into the engaged position). When the closure panel 70 is pivoted open, the outer surfaces 86a and 84a may then release the switch 78 (e.g., allow the switch 78 to move the disengaged position). In this way, when the closure panel 70 is closed, power may be provided to the auger 26, and, when the closure panel 70 is open, power may not be provided to the auger 26 and operation f the auger 26 may be interrupted.

As depicted, the bracket 82 is disposed near the side of the closure panel 70, such that the base segment 84 of the bracket 82 is generally aligned with an edge 88 of the closing face 72. In this way, for example, the valve 76 may be disposed generally to the side of the access opening 28, and the switch 78 correspondingly disposed for engagement (and disengagement) by the engagement surfaces 86a and 84a of the ramp and base segments 86 and 84 of the bracket 82. In other embodiments, the bracket 82 may be disposed at other locations with respect to the closure panel 70, the closing face 72, the valve 76, the switch 78, or various other features.

Figure 7:
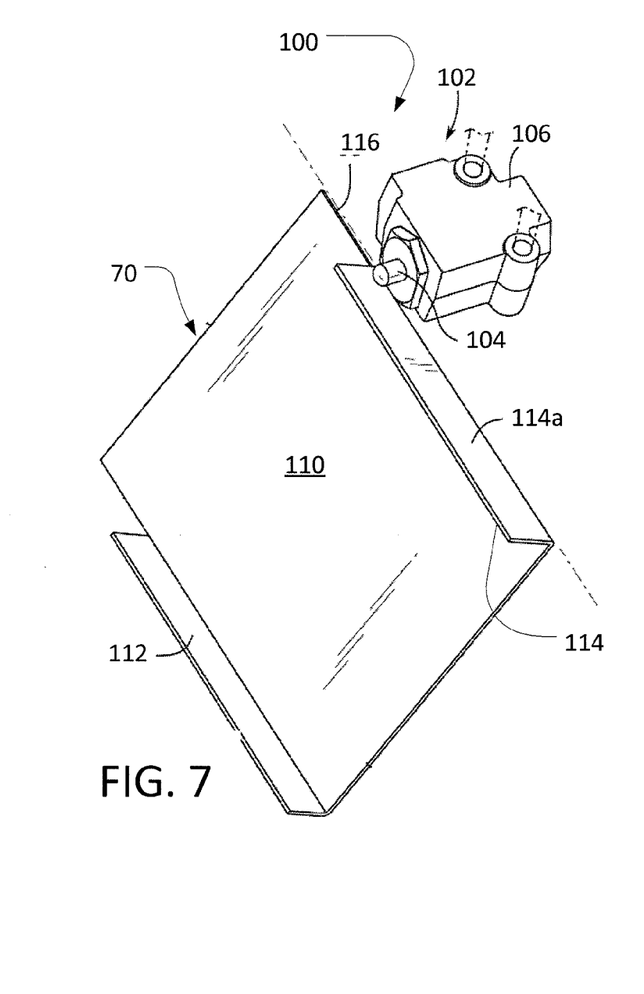
FIGS. 7 and 8 are perspective views of yet another example lockout closure mechanism shown in open and closed positions, respectively.
Figure 8:
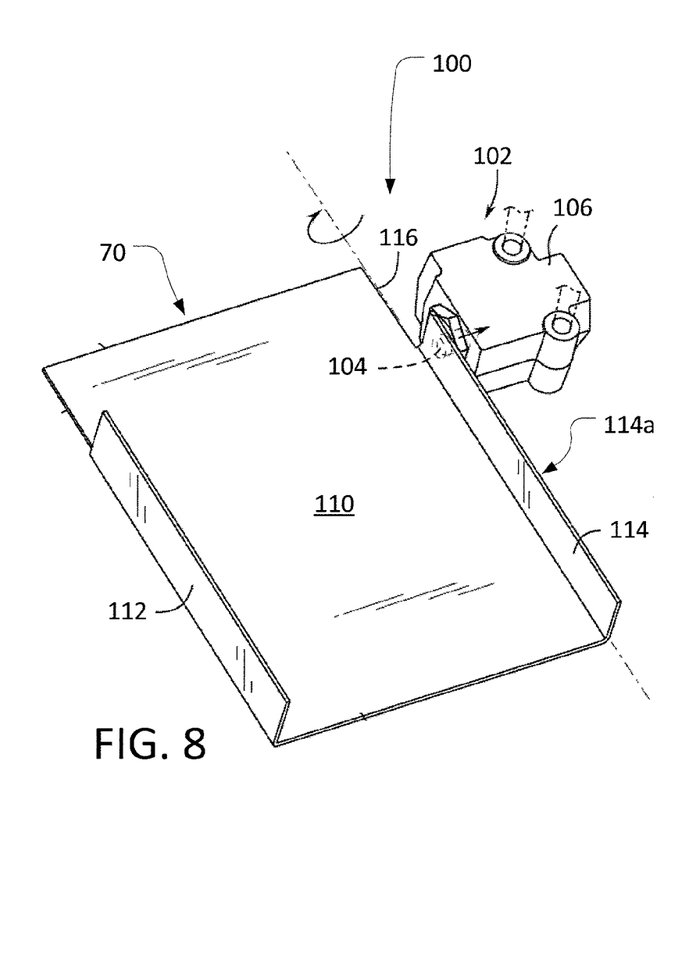

In certain embodiments, a closure panel may be configured to pivot about a different axis, with respect to a relevant switch. Referring also to FIGS. 7 and 8, for example, a lockout closure 100 includes an interlock device configured as a valve 102 with a button switch 104 extending from a valve body 106. The valve 102 may be mounted with respect to the access opening 28 in a similar manner to the valve 34 (or otherwise). A closure panel 108 with a closing face 110 and side walls 112 and 114 is pivotally mounted with respect to the access opening 28 (e.g., with hinges, pins, or otherwise (not shown)), such that the closure panel 108 may pivot along a pivot axis 116 between an open position (see, e.g., FIG. 7) and a closed position (see, e.g., FIG. 8), in order to uncover or cover the access opening 28, respectively. In the depicted configuration, the outer surface 114a of the side wall 114 may serve as an engagement surface, with the surface 114a engaging the switch 104 when the closure panel 108 is in the closed position (see, e.g., FIG. 8) and disengaging the switch 104 when the closure panel 108 is pivoted towards the open position (see, e.g., FIG. 7). In this way, for example, when the closure panel 108 is closed, power may be provided to the auger 26, and, when the closure panel is open, power may not be provided to the auger 26.

As discussed above with regard to the side wall 46, the side wall 114, due to its role in engaging and disengaging the switch 104, may be generally viewed as a lockout member. In other embodiments, a different lockout member may be provided for the closure panel 108 in order to engage and disengage the switch 104 and thereby control power delivery to the auger 26 (or another moving component 24).

In certain embodiments, a switch may be engaged (and disengaged) by twisting (or other action). For example, referring also to FIGS. 9 and 10, a lockout closure 122 includes an interlock device configured as a valve 124 with a valve body 126 and a switch 128. The valve 124 may be mounted with respect to the access opening 28 in a similar manner to the valve 34 (or otherwise). As depicted, the switch 128 may be engaged by turning the switch 128 in a counterclockwise (from the perspective of FIGS. 9 and 10) and may be disengaged by turning the switch 128 in a clockwise direction (from the perspective of FIGS. 9 and 10). (It will be understood that other configurations are possible.)

In the lockout closure 122, a closure panel 130 with a closing face 132 and side walls 134 and 136 is pivotally mounted with respect to the access opening 28 (e.g., with hinges, pins, or otherwise (not shown)). Accordingly, the closure panel 130 may pivot along a pivot axis 138 between an open position (see, e.g., FIG. 9) and a closed position (see, e.g., FIG. 10), in order to uncover or cover the access opening 28, respectively. The side wall 136 is attached to the switch 128 and the pivot axis 138 is aligned with the pivoting axis of the switch 128, such that when the side wall 136 is pivoted about the axis 138, the switch 128 may be turned. Accordingly, when the closure panel 130 is pivoted toward the open position (e.g., as in FIG. 9), the switch 128 may be turned such that the switch 128 is disengaged and power is not provided to the auger 26. In contrast, when the closure panel is pivoted to the closed position (e.g., as in FIG. 10), the switch 128 may be turned such that the switch 128 is engaged and power is provided to the auger 26. In the embodiment depicted, a guard 140 similar to the guard 58 (see, e.g., FIGS. 3 and 4) may be provided to protect the switch 128 from fouling or other detrimental effects.

Figure 9:
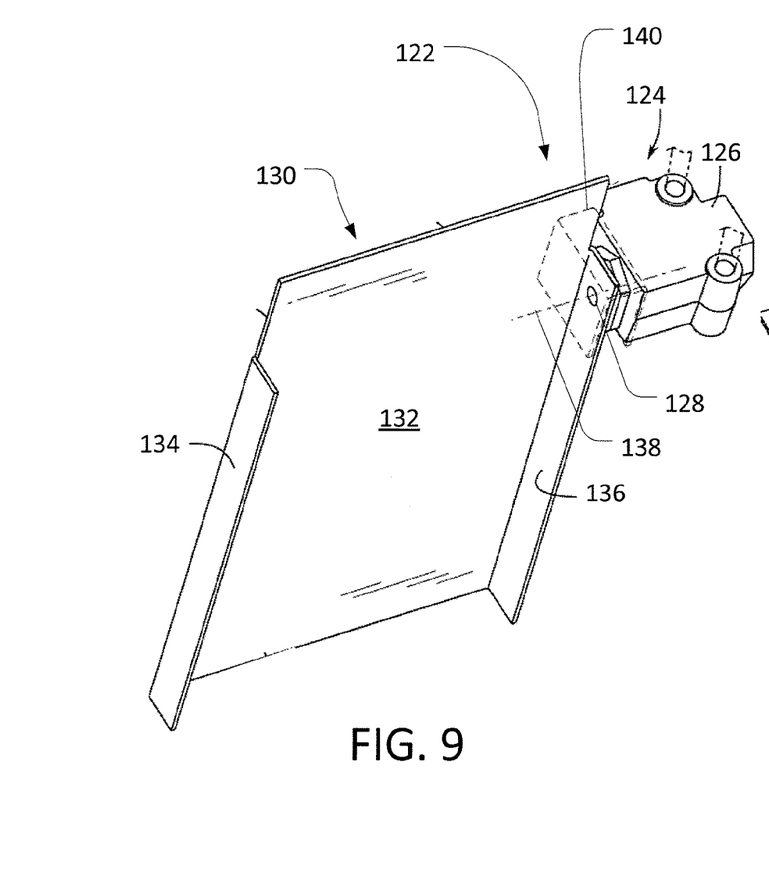
FIGS. 9 and 10 are perspective views of yet another example lockout closure mechanism shown in open and closed positions, respectively.
Figure 10:
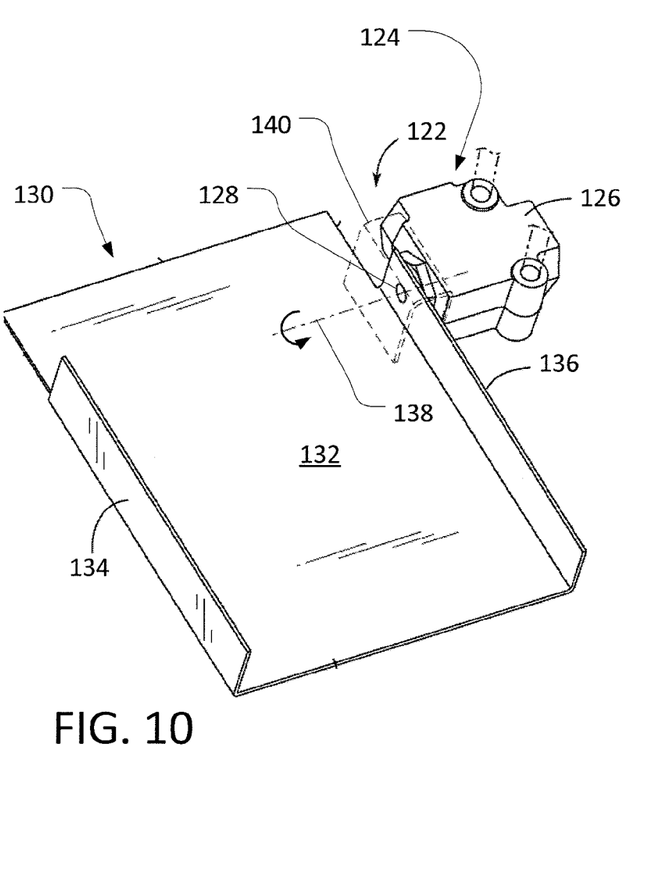

As discussed above with regard to the side walls 46 and 114, the side wall 136, due to its role in engaging and disengaging the switch 128, may be generally viewed as a lockout member. Further, an outer surface 136a of the side wall 136 that is in contact with the switch 128 to turn the switch 128 with the closure panel 130 may be viewed as an engagement surface. In other embodiments, a different lockout member or engagement surface may be provided for the closure panel 130 in order to engage and disengage the switch 128 to control the interruption of power delivery (and thereby interrupt operation of) the auger 26 (or another moving component 24).

Figure 11:
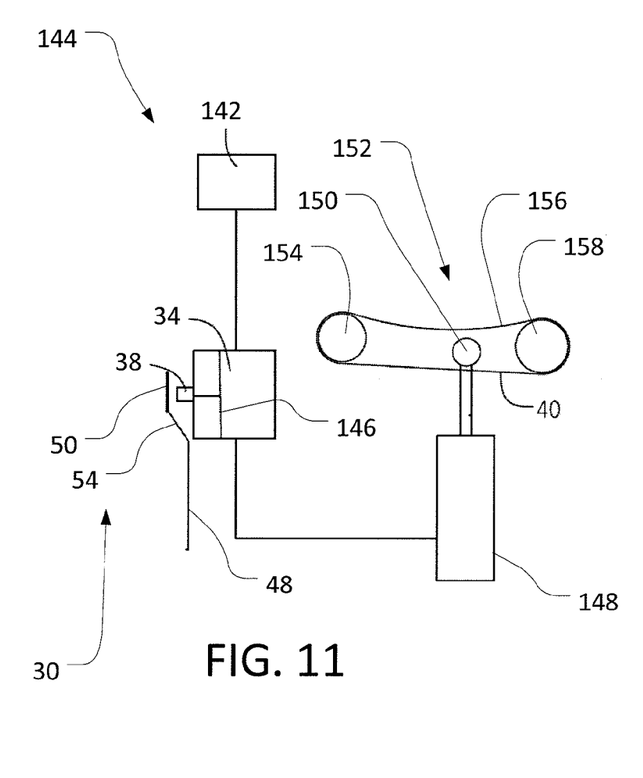
FIGS. 11 and 12 are schematic views depicting an arrangement of certain moving components of the agricultural combine.
Figure 12:
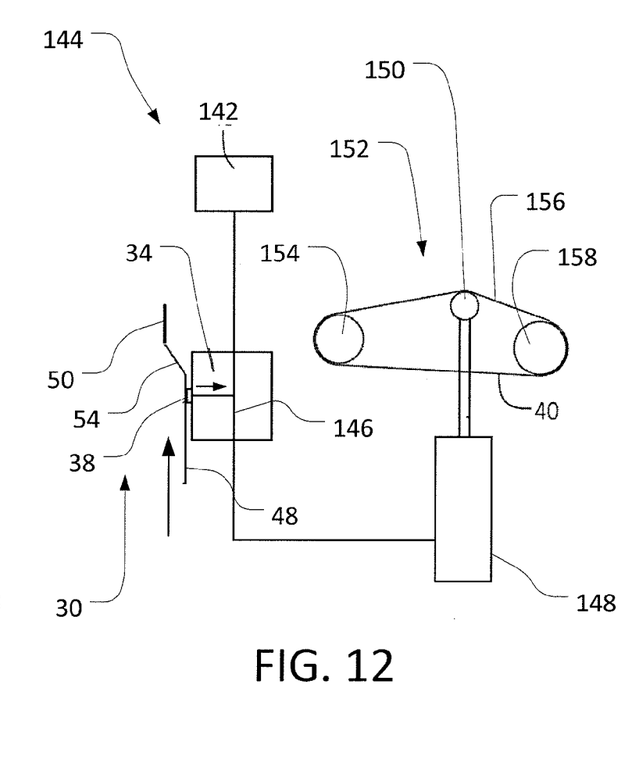

The various interlock devices (e.g., valves and switches) discussed above (and others) may operate in various ways in order to provide and interrupt power for the auger 26 (or other moving components 24). Referring also to FIGS. 11 and 12, for example, a control and actuation system 144 is depicted, which may be operated, at least in part, via the valve 34 and the switch 38. It will be understood that although control of the control and actuation system 144 is described below with respect to the lockout closure 36 (see, e.g., FIGS. 3 and 4), other lockout closures (e.g., the lockout closures 68, 100, or 122) may also be utilized. Likewise, other control and actuation systems may be utilized that vary from the system 144 depicted in FIGS. 11 and 12. For example, in various embodiments, other hydraulic systems, electric systems, electrohydraulic, mechanical, pneumatic, or other control and actuation systems may be implemented.

In the embodiment depicted, the valve 34 includes a movable internal flow passage 146 connected to the switch 38. A hydraulic (or other) pressure source such as a pump 142 is disposed upstream of the valve 34 and a hydraulic (or other) actuator 148 (e.g., configured as a cylinder and piston) is disposed downstream of the valve 34. The hydraulic actuator 148 is configured to move a tensioning wheel 150 (e.g., a pulley) depending on the pressurization of the actuator 148 by the pump 142. A drive system 152 includes a first wheel 154 (e.g., another pulley) configured to receive operational power from a power plant (not shown) of the combine 20 and to transmit the received power over a flexible element such as a belt 156 to a second wheel 158 (e.g., still another pulley). The second wheel 158 may be connected to a drive mechanism (not shown) of the auger 26, such that when the wheel 158 receives rotational power from the wheel 154, the auger 26 receives operational power. The belt 156 may be configured to be generally too loosely supported by the wheels 154 and 158, absent appropriate tension from the tensioning wheel 150, to power operation of the auger 26.

In a first state of the actuator 148 (depicted in FIG. 11 as a retracted state for the piston and the tensioning wheel 150), the tensioning wheel 150 does not provide operational tension to the belt 156. Accordingly, power may not be transferred by the belt 156 between the wheels 154 and 158, and the auger 26 may not receive operational power (i.e., operation of the auger 26 may be interrupted). In a second state of the actuator 148 (depicted in FIG. 12 as an extended state for the piston and the tensioning wheel 150), the tensioning wheel 150 provides operational tension to the belt 156, such that power is transferred by the belt 156 between the wheels 154 and 158. Accordingly, the auger 26 may receive operational power. In this way, depending on the state of the actuator 148, the auger 26 may be powered or may not be powered.

Through the interaction of the engagement surfaces 48a, 50a, and 54a of the closure panel 30 with the switch 38 (or another switch of a different interlock device), the actuator 148 may be placed in either of the retracted or extended states noted above. Accordingly, depending on the position of the closure panel 30 with respect to the switch 38, the auger 26 may or may not receive operational power. As depicted in FIG. 11, for example, the closure panel 30 is not in the closed position, so the switch 38 has not been engaged. Correspondingly, flow from the pump 142 has not been routed to the actuator 148 by the internal flow passage 146 of the valve 34, operational tension is not provided to the belt 156 by the tensioning wheel 150, and power for the auger 26 is not transmitted from the wheel 154 to the wheel 158. In contrast, as depicted in FIG. 12, the closure panel 30 is in the closed position, so the switch 38 has been engaged by the ramp segment 54 and the second segment 50 of the side wall 46. As a result, the pump 142 has been connected to the actuator 148 via the internal flow passage 146, operational tension has been provided to the belt 156 by the tensioning wheel 150, and power for the auger 26 may be transmitted from the wheel 154 to the wheel 158. In this way, for example, when the closure panel 30 is appropriately closed, the auger 26 may be operated. However, when the closure panel 30 is open, the auger 26 may not receive power for operation.

The terminology used herein is for the purpose of describing particular embodiments only and is not intended to be limiting of the disclosure. For example, the terms "upper," "lower," and the like may be used with respect to the relative orientation of a particular embodiment, but may not be intended to limit the disclosure to that orientation nor embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. In an agricultural combine (20) having a grain tank (22) with an access opening (28) and having a powered grain-moving device (26) associated with the grain tank, a lockout closure comprising:
    an interlock device (76) operatively coupled to the grain moving device, the interlock device having a movable switch mechanism (38) for interrupting operation of the grain-moving device; and
    a closure panel (30) movably attached to the grain tank, the closure panel having an engagement surface (48a, 50a, 54a) movable with respect to the interlock device in order to interact with the switch mechanism, and the closure panel being movable between an open position, in which the closure panel is positioned to uncover the access opening, and a closed position, in which the closure panel is positioned to cover the access opening;
    wherein, with the closure panel in the open position, the engagement surface one of engages and disengages the switch mechanism such that the interlock device interrupts operation of the grain-moving device;
    wherein the engagement surface of the closure panel is included on a lockout member (48) extending away from a closing face (42) of the closure panel; and
    wherein, when the closure panel is moved from the closed position to the open position, the lockout member one of engages and disengages the switch mechanism, in order to interrupt operation of the grain-moving device.

2. The lockout closure of claim 1, wherein the engagement surface disengages the switch mechanism when the closure panel is in the open position, and engages the switch mechanism when the closure panel is in the closed position.

3. The lockout closure of claim 1, wherein the grain-moving device is hydraulically powered and the interlock device includes a hydraulic valve.

4. The lockout closure of claim 3, wherein the switch mechanism opens and closes the hydraulic valve to control a flow of hydraulic fluid.

5. The lockout closure of claim 4, wherein, when the hydraulic valve is open, the flow of hydraulic fluid activates a hydraulic piston (148) in order to apply operational tension to a drive belt (156) for the grain-moving device.

6. The lockout closure of claim 1, wherein the lockout member includes a ramp segment (54) for one of engaging and disengaging the switch mechanism, when the closure panel is moved from the closed position to the open position, in order to interrupt operation of the grain-moving device.

7. The lockout closure of claim 6, wherein the closure panel is slidably engaged with the grain tank, the lockout member forms part of a side wall (46) of the closure panel, and the ramp segment extends from the side wall at an oblique angle with respect to an outer face of the side wall; and wherein the ramp segment one of engages and disengages the switch mechanism when the closure panel is slid from the closed position to the open position, in order to interrupt operation of the grain-moving device.

8. The lockout closure of claim 7, wherein the switch mechanism extends a first extension distance from a body of the interlock device when engaged, and extends a second extension distance from the body of the interlock device when disengaged, the first distance being different from the second distance;

wherein a first segment (48) of the side wall extends along a side plane that is perpendicular to the closing face of the closure panel;

wherein a second segment (50) of the side wall extends along an offset plane spaced from the side plane to form a gap (52) between the body of the interlock device and the second segment of the side wall, the gap having a gap distance at least as long as the difference between the first extension distance and the second extension distance of the switch mechanism; and wherein the ramp segment extends between the first and second segments of the side wall, such that when the closure panel is slidably moved from the closed position to the open position, the ramp segment causes the switch mechanism to move between one of the first and second extension distances and the other of the first and second extension distances, in order to interrupt operation of the grain-moving device.

9. The lockout closure of claim 1, wherein the closure panel (70) is pivotally engaged with the grain tank, and the lockout member (82) is disposed at one or more of a perpendicular and an oblique angle with respect to the closing face of the closure panel, such that the lockout member one of engages and disengages the switch mechanism when the closure panel is pivoted from the closed position to the open position, in order to interrupt operation of the grain-moving device.

10. In an agricultural combine (20) having a grain tank (22) with an access opening (28), a powered auger (26) associated with the grain tank, and a control and actuation system (144) for the auger, a lockout closure comprising:

an interlock device (34) operatively coupled to the control and actuation system, the interlock device having a movable switch mechanism (38) for interrupting operation of the auger; and a closure panel (30) movably attached to the grain tank, the closure panel having an engagement surface (48a, 50a, 54a) movable with respect to the interlock device in order to interact with the switch mechanism, and the closure panel being movable between an open position, in which the closure panel is positioned to uncover the access opening, and a closed position, in which the closure panel is positioned to cover the access opening;

wherein, with the closure panel in the open position, the engagement surface engages the switch mechanism such that the interlock device interrupts operation of the auger, and wherein, with the closure panel in the closed position, the engagement surface disengages the switch mechanism such that the interlock device permits operation of the auger;

wherein the closure panel includes a closing face (42) for covering the access opening; and wherein the engagement surface of the closure panel is included on a side wall (46) extending away from a closing face of the panel along a side edge of the closure panel.

11. The lockout closure of claim 10, wherein the auger is hydraulically powered and the lockout device is a hydraulic valve; and wherein, when engaged, the switch mechanism opens the valve for a flow of hydraulic fluid, and, when disengaged, the switch mechanism closes the valve to the flow of hydraulic fluid.

12. The lockout closure of claim 11, wherein, when the hydraulic valve is open, the flow of hydraulic fluid activates a hydraulic piston (148) in order to apply operational tension to a drive belt (156) for the auger.

13. The lockout closure of claim 11, wherein the side wall includes a ramp segment (54) for engaging the switch mechanism when the closure panel is moved from the open position to the closed position, in order to permit operation of the auger.

14. The lockout closure of claim 13, wherein the switch mechanism extends a first extension distance from a body of the interlock device when engaged, and extends a second extension distance from the body of the interlock device when disengaged, the first distance being different from the second distance;

wherein a first segment (48) of the side wall extends along a side plane of the panel perpendicular to the closing face;

wherein the side wall further includes a second segment (50) extending along an offset plane spaced from the side plane to form a gap (52) between a body of the interlock device and the offset segment, the gap having a gap distance at least as long as the difference between the first extension distance and the second extension distance of the switch mechanism; and wherein the ramp segment extends between the first and second segments of the side wall, such that when the closure panel is slidably moved from the open position to the closed position, the ramp segment causes the switch mechanism to move between the second extension distance and the first extension distance, in order to permit operation of the auger.

15. The lockout closure of claim 11, wherein the closure panel (70) is pivotally engaged with the grain tank, the closure panel includes a closing face (72) for covering the access opening, and the engagement surface of the closure panel is included on a lockout member (82) extending away from the closing face; and wherein the lockout member is disposed at one or more of a perpendicular and an oblique angle with respect to the closing face of the closure panel, such that the lockout member engages the switch mechanism when the closure panel is pivoted from the open position to the closed position, in order to permit operation of the auger.

16. An agricultural combine comprising:

a grain tank (22) with an access opening (28);

an auger (26) disposed, at least in part, within the grain tank;

a control and actuation assembly (144) for powering the auger; and a lockout closure (36), including:

an interlock device (34) having a movable switch mechanism (38) operatively coupled to the control and actuation assembly; and a closure panel (30) slidably engaged with the grain tank to cover the access opening, the closure panel having an engagement surface (48a, 50a, 54a) configured to interact with the switch mechanism of the interlock device, and the closure panel being movable between an open position, in which the closure panel is positioned to uncover the access opening, and a closed position, in which the closure panel is positioned to cover the access opening;

wherein, with the closure panel in the open position, the engagement surface disengages the switch mechanism such that the interlock device interrupts operation of the auger, and wherein, with the closure panel in the closed position, the engagement surface engages the switch mechanism such that the interlock device permits operation of the auger;

wherein the engagement surface of the closure panel is included on a side wall (46) of the closure panel that extends away from a closing face of the closure panel along a side plane of the panel perpendicular to the closing face, the side wall including a ramp segment (54) extending from the side wall at an oblique angle with respect to an outer face of the side wall; and wherein the side wall includes an offset segment (50) extending along an offset plane spaced from the side plane and forming a gap (52) between a body (40) of the interlock device and the offset segment, such that, when the closure panel is slidably moved from the closed position to the open position, the ramp segment disengages the switch mechanism to interrupt operation of the auger, and, when the closure panel is slidably moved from the open position of the closed position, the ramp segment engages the switch mechanism to permit operation of the auger.

17. The agricultural combine of claim 16, wherein the auger is hydraulically powered and the lockout device is a hydraulic valve; and wherein, when engaged, the switch mechanism opens the valve for a flow of hydraulic fluid, and, when disengaged, the switch mechanism closes the valve to the flow of hydraulic fluid.

* * * * *